(12) United States Patent
Raffay et al.

(10) Patent No.: US 12,051,069 B2
(45) Date of Patent: Jul. 30, 2024

(54) WEB-BASED ORDER PROCESSING SYSTEM AND TECHNIQUES FOR PROCESSING ORDERS VIA WEBPAGE NON-FUNGIBLE TOKENS

(71) Applicant: Concept Source, Inc., Plainview, NY (US)

(72) Inventors: Charles Raffay, Jensen Beach, FL (US); Robert Fallas, Huntington, NY (US)

(73) Assignee: Concept Source, Inc., Plainview, NY (US)

( * ) Notice: Subject to any disclaimer, the term of this patent is extended or adjusted under 35 U.S.C. 154(b) by 293 days.

(21) Appl. No.: 17/658,502

(22) Filed: Apr. 8, 2022

(65) Prior Publication Data

US 2023/0259942 A1    Aug. 17, 2023

Related U.S. Application Data

(63) Continuation-in-part of application No. 17/651,125, filed on Feb. 15, 2022, now Pat. No. 11,822,944.

(51) Int. Cl.
*G06Q 20/40* (2012.01)
*G06Q 20/06* (2012.01)
(Continued)

(52) U.S. Cl.
CPC ....... *G06Q 20/4014* (2013.01); *G06Q 20/065* (2013.01); *G06Q 20/227* (2013.01); *G06Q 20/363* (2013.01)

(58) Field of Classification Search
CPC ............. G06Q 20/065; G06Q 20/4014; G06Q 20/227; G06Q 20/363
See application file for complete search history.

(56) References Cited

U.S. PATENT DOCUMENTS 6,763,377 B1   7/2004   Belknap et al.
8,074,248 B2   12/2011   Sigmon, Jr. et al.
(Continued)

FOREIGN PATENT DOCUMENTS

AU   2021902227      8/2021
WO   2019139678 A1   7/2019
(Continued)

OTHER PUBLICATIONS

Chang et al., "Automatic information extraction from semi-structured Web pages by pattern discovery" (Year: 2003).
(Continued)

*Primary Examiner* — Phillip H Nguyen
(74) *Attorney, Agent, or Firm* — M&B IP Analysts, LLC

(57) ABSTRACT

Techniques for order processing and for providing order processing application functionality using webpage non-fungible tokens (NFTs). A method includes accessing a database including nodes to identify a user and a payment account with respect to a request for processing of an order received via a webpage NFT. The webpage NFT is a webpage encoded into at least one portion of code and represented as at least one webpage and NFT node pair in the database. The user and the payment account are identified based on nodes in the database connected to the webpage and NFT node pair. The method also includes accessing the identified payment account in order to cause processing of a payment for the order and processing the order when the payment has been processed.

19 Claims, 7 Drawing Sheets

(51) Int. Cl.
*G06Q 20/22* (2012.01)
*G06Q 20/36* (2012.01)

(56) References Cited

U.S. PATENT DOCUMENTS

| | | | |
|---|---|---|---|
| 9,292,682 | B2 | 3/2016 | Grube et al. |
| 9,578,085 | B2 | 2/2017 | Smith et al. |
| 9,904,923 | B2 | 2/2018 | Mattsson et al. |
| 10,043,174 | B1* | 8/2018 | Chikkanna ......... G06Q 20/3676 |
| 10,262,128 | B2 | 4/2019 | Bomar et al. |
| 10,600,009 | B1 | 3/2020 | Augustine et al. |
| 11,075,891 | B1 | 7/2021 | Long et al. |
| 11,102,255 | B2 | 8/2021 | Davis et al. |
| 2002/0083095 | A1* | 6/2002 | Wu ..................... G06Q 30/06 707/999.1 |
| 2007/0245353 | A1 | 10/2007 | Ben-Dor |
| 2011/0161400 | A1 | 6/2011 | Silyaev et al. |
| 2013/0125247 | A1 | 5/2013 | Sprague et al. |
| 2017/0012980 | A1 | 1/2017 | Sanso et al. |
| 2019/0287175 | A1 | 9/2019 | Hill et al. |
| 2019/0303892 | A1 | 10/2019 | Yantis et al. |
| 2019/0392511 | A1 | 12/2019 | Mahajan et al. |
| 2020/0034869 | A1 | 1/2020 | Harrison |
| 2020/0111068 | A1 | 4/2020 | Scarselli |
| 2020/0160289 | A1 | 5/2020 | Mahajan et al. |
| 2020/0184041 | A1 | 6/2020 | Andon et al. |
| 2020/0184547 | A1 | 6/2020 | Andon et al. |
| 2020/0242105 | A1 | 7/2020 | Rich et al. |
| 2020/0272713 | A1 | 8/2020 | Black |
| 2020/0273048 | A1 | 8/2020 | Andon et al. |
| 2020/0394705 | A1* | 12/2020 | Daie .................. G06Q 30/0633 |
| 2021/0049234 | A1 | 2/2021 | Kumar et al. |
| 2021/0174432 | A1 | 6/2021 | Gonnaud et al. |
| 2021/0248594 | A1 | 8/2021 | Yantis et al. |
| 2021/0256070 | A1 | 8/2021 | Tran et al. |
| 2021/0295324 | A1 | 9/2021 | Kerseboom et al. |
| 2021/0304197 | A1* | 9/2021 | Pomassl ............. G06Q 20/3223 |
| 2021/0342909 | A1* | 11/2021 | Ketchel, III ........... G06Q 20/10 |
| 2022/0006996 | A1 | 1/2022 | Boissonade et al. |
| 2023/0092012 | A1 | 3/2023 | Matthews et al. |

FOREIGN PATENT DOCUMENTS

| | | |
|---|---|---|
| WO | 2020118297 A1 | 6/2020 |
| WO | 2020214880 A1 | 10/2020 |

OTHER PUBLICATIONS

Karandikar et al., "Blockchain Based Transaction System with Fungible and Non-Fungible Tokens for a Community-Based Energy Infrastructure" (Year: 2021).
Liang et al., "The Scheme of Detecting Encoded Malicious Web Pages Based on Information Entropy" (Year: 2016).
Wang et al., "Non-Fungible Token (NFT): Overview, Evaluation, Opportunities and Challenges" (Year: 2015).
Wen et al., "Detecting Malicious Websites in Depth through Analyzing Topics and Web-pages" (Year: 2018).
Chen et al., "Anomaly Behavior Analysis for Web Page Inspection" (Year: 2009).
Haekal et al., "Token-Based Authentication Using JSON Web Token on SIKASIR RESTful Web Service" (Year: 2016).
Markus Moilanen, "Developing a Web Service Databases, Security and Access Control" (Year: 2019).
Soroush Sedaghat, "Web Authenticity" (Year: 2002).

* cited by examiner

WEB-BASED ORDER PROCESSING SYSTEM AND TECHNIQUES FOR PROCESSING ORDERS VIA WEBPAGE NON-FUNGIBLE TOKENS

CROSS-REFERENCE TO RELATED APPLICATIONS

This application is a continuation-in-part of U.S. patent application Ser. No. 17/651,125 filed on Feb. 15, 2022, the contents of which are hereby incorporated by reference.

TECHNICAL FIELD

The present disclosure relates generally to order processing, and more specifically to providing order processing software applications and application functionality via NFTs.

BACKGROUND

As computing devices have become a part of daily life, delivery of specific computer programs to these computing devices has become increasingly relevant to aiding in daily activities. Many modern computing devices like smartphones, personal computers, tablet computers, and laptop computers utilize software applications (often referred to as "applications" or "apps"), which are computer programs designed to carry out a specific task other than operation of the computing device on which the app is installed. Use of these apps has expanded so much that the word "apps" has entered the modern lexicon and the number of apps installed on any given device can easily be in the dozens.

Due to the convenience and expediency that can be achieved by using software applications to provide new computing functions, users often install many apps on their computing devices. The kinds of apps installed may be used to perform tasks such as, but not limited to, browsing the web, viewing emails, making purchases, playing games, watching videos, listening to music or podcasts, making phone or video calls, sending messages, navigating, and many more.

Some apps may include functionality for order processing or otherwise for processing payments of users. The orders may be, for example, for real world goods represented in the app, for in-app content, and the like. Typically, a user links a payment account to an account for the app or otherwise provides payment information to the app.

Some disadvantages of order processing through apps relate to authenticating users and conducting transactions, which often prove inconvenient for users who may be asked to complete multiple information-providing steps before actually proceeding to download an application. Further, once the app is downloaded, the user may need to either create an account with the app developer or verify their identity in order to access various app features. This inconvenience may be compounded when a user wants to download the same app on multiple devices.

Some shortcuts for the authentication and payment issues exist (for example, saving a payment method with the app store provider), but these shortcuts themselves often have disadvantages. For example, saving a credit card number with an app store provider may leave the user's payment information vulnerable in the event of a hack or may open up opportunities for children to inadvertently rack up significant charges on in-app purchases.

Another disadvantage of existing order processing solutions is that apps must often be developed differently for different types of devices. More specifically, different versions of apps are usually developed for different operating systems. As a result, a user wanting a given app on multiple devices (for example, a smartphone and a laptop computer) may need to download different versions of the app from different app stores. This is very inconvenient for users, and may require authenticating and/or providing payment information multiple times before orders can be processed.

Given the above challenges and many more, new methods for delivering software applications and for providing order processing functionality in software applications are highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing order processing functionality via tokenized software applications. The method comprises: identifying a user and a payment account of the user with respect to a request for processing of an order received via a webpage NFT, wherein identifying the user and the payment account further comprises accessing a database including a plurality of nodes, wherein the webpage NFT is a webpage encoded into at least one portion of code and represented as at least one webpage and NFT node pair in the database, wherein the user and the payment account are identified based on data stored in at least one node of the plurality of nodes in the database connected to the webpage and NFT node pair, wherein the request for processing of the order is sent by the webpage NFT in response to user interactions with the webpage via a user device that navigated to the webpage; accessing the identified payment account in order to cause processing of a payment for the order; and processing the order when the payment has been processed.

Certain embodiments disclosed herein also include a non-transitory computer readable medium having stored thereon causing a processing circuitry to execute a process, the process comprising: identifying a user and a payment account of the user with respect to a request for processing of an order received via a webpage NFT, wherein identifying the user and the payment account further comprises accessing a database including a plurality of nodes, wherein the webpage NFT is a webpage encoded into at least one portion of code and represented as at least one webpage and NFT node pair in the database, wherein the user and the payment account are identified based on data stored in at least one node of the plurality of nodes in the database connected to the webpage and NFT node pair, wherein the request for processing of the order is sent by the webpage NFT in response to user interactions with the webpage via a user device that navigated to the webpage; accessing the identified payment account in order to cause processing of a payment for the order; and processing the order when the payment has been processed.

Certain embodiments disclosed herein also include a system for providing order processing functionality via tokenized software applications. The system comprises: a processing circuitry; and a memory, the memory containing instructions that, when executed by the processing circuitry, configure the system to: identifying a user and a payment account of the user with respect to a request for processing of an order received via a webpage NFT, wherein the system is further configured to access a database including a plurality of nodes, wherein the webpage NFT is a webpage encoded into at least one portion of code and represented as at least one webpage and NFT node pair in the database, wherein the user and the payment account are identified based on data stored in at least one node of the plurality of nodes in the database connected to the webpage and NFT node pair, wherein the request for processing of the order is sent by the webpage NFT in response to user interactions with the webpage via a user device that navigated to the webpage; access the identified payment account in order to cause processing of a payment for the order; and process the order when the payment has been processed.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
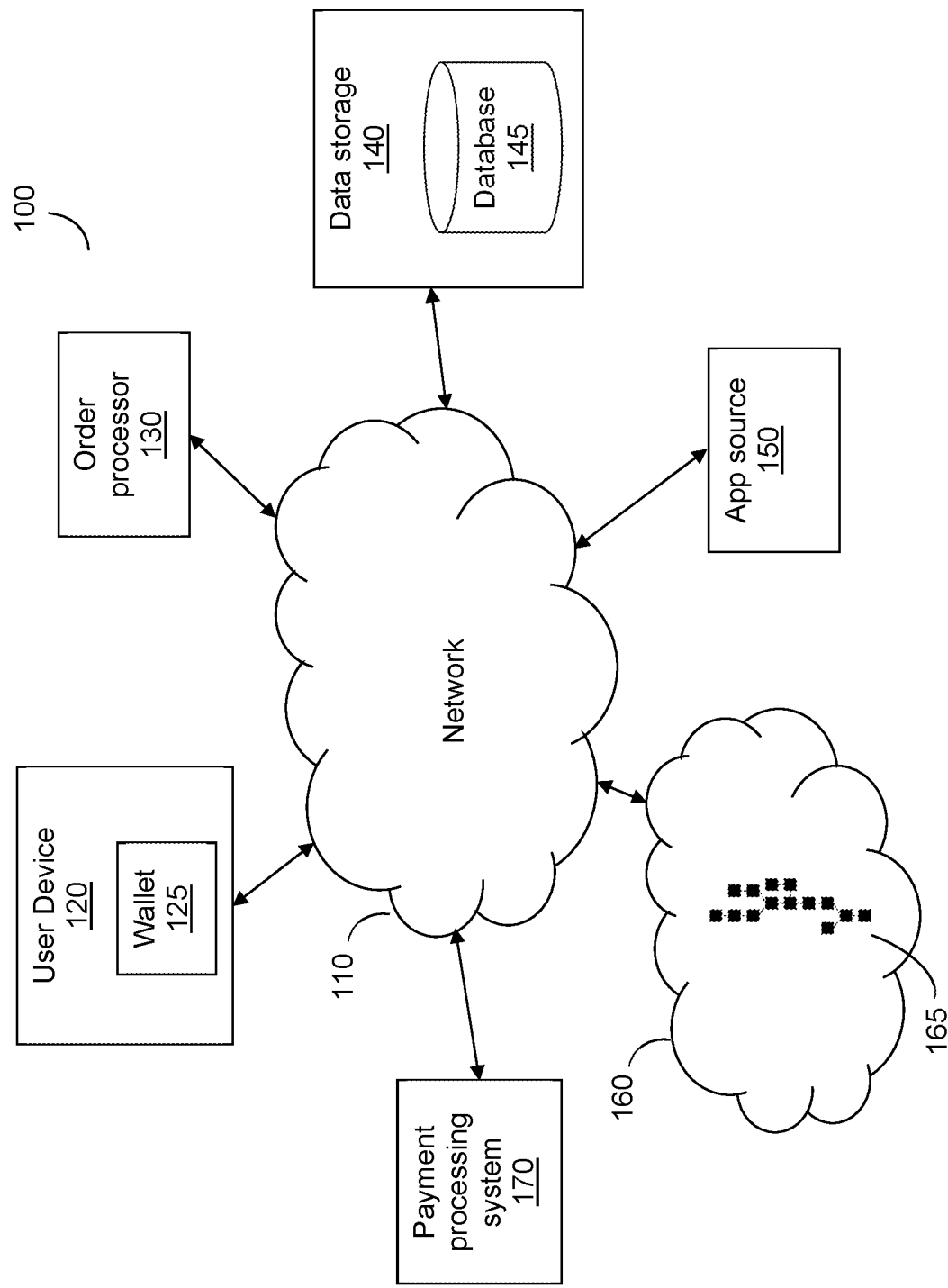
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for processing orders via webpage non-fungible tokens (NFTs). The disclosed embodiments provide new techniques for processing orders that manipulate interactions with the Internet and, particular, using webpages tokenized as NFTs, in order to authenticate users, facilitate payment processing, and more. The disclosed embodiments further include techniques for delivering apps and for allowing users to access app features that do not require use of existing app stores or similar platforms that can be utilized to provide apps that are readily compatible with the order processing techniques discuss herein.

The disclosed embodiments include techniques for processing orders utilizing tokenized webpages. A request to process an order is received via a webpage NFT, where the webpage NFT is an encoded webpage represented in a database. The webpage NFT is created by encoding a webpage including media content representing a unique asset in the form of an app, where the app has functionality for at least processing orders such that the encoded webpage includes instructions for order processing. The webpage NFT is further associated with a user, i.e., through data in one or more of the nodes in the database connected to the webpage node, the NFT node, or both. In this manner, a known identity of the user of the app corresponding to the webpage NFT is represented in the database.

Based on the webpage NFT which sent the request and the data stored in the database, an identity of the user whose order should be processed is identified. Optionally, a location of the user may be determined, for example in order to determine a location for delivery or to confirm eligibility to place the order.

A payment account of the user is identified, for example through payment credentials stored in the database, currency nodes stored in the database, or otherwise through payment account information stored in the database. The identified payment account is accessed, for example by sending a request to a payment processing system based on the identified payment account or by updating nodes of the database to reflect a withdrawal of funds pursuant to the payment.

Based on the user information, payment information, or both, the order is validated. The validated order is processed, thereby completing the order. An order verification notification may be sent to an account of the user (e.g., an email address) or to the device which accessed the webpage NFT in order to request the transaction (e.g., via SMS message). Optionally, the order may be delivered to the user, for example by drone using the identified user location.

The disclosed embodiments utilize encoded webpages tokenized as NFTs in order to authenticate users requesting orders. As a result, the disclosed embodiments allow for utilizing the webpage NFTs as a factor of authentication for the user in order to request an order, thereby improving security for the order processing application, particularly with respect to orders for which the user wishes to use stored payment account information. More specifically, the webpage NFT may be uniquely associated with the user as reflected in the database such that accessing the webpage NFT associated with a particular user can be used to accurately identify the user requesting the order. Accordingly, the disclosed embodiments provide, among other things, ways to improve cybersecurity of order processing applications.

The disclosed embodiments further allow for order processing via apps that do not require downloading applications in specific versions or formats, and may allow for accessing payment accounts of the user without requiring separate authentication (i.e., accessing the webpage NFT may be the only authentication required) or with a reduced number of authentication steps (e.g., only one added step may be needed for a two-factor authentication since accessing the webpage NFT may serve as a first factor of authentication). Moreover, since the webpage app NFTs disclosed herein do not require downloading different apps on different devices in order to realize app functionality on each device, the disclosed embodiments provide new techniques for allowing cross-compatibility of apps across different types of devices. Thus, the disclosed embodiments allow for providing apps and, in particular, apps requiring user authentication and/or accessing payment accounts, in a secure but convenient manner.

The disclosed embodiments further utilize encoded portions of web-based app content tokenized as nodes in a database in order to effectively enable tokenizing apps as NFTs and to provide application functionality by accessing webpages associated with these app NFTs. More specifically, the disclosed embodiments provide techniques which manipulate interactions with the Internet in order to transform apps into NFTs, namely, by encoding webpages including instructions for providing application functionality of apps into portions of code, distributing the encoded webpages among a database, and connecting webpage nodes representing the encoded webpages to respective NFT nodes representing ownership of a webpage or portion thereof as an NFT. The disclosed embodiments further include techniques for transforming apps into webpages in order to enable tokenization of apps via such tokenization of webpages.

FIG. 1 shows an example network diagram 100 utilized to describe the various disclosed embodiments. In the example network diagram 100, a user device 120 an order processor 130, a data storage 140, an app source 150, a blockchain network 160, and a payment processing system 170 communicate via a network 110.

The network 110 may be, but is not limited to, a wireless, cellular or wired network, a local area network (LAN), a wide area network (WAN), a metro area network (MAN), the Internet, the worldwide web (WWW), similar networks, and any combinations thereof.

The user device 120 may be, but is not limited to, a personal computer, a laptop, a tablet computer, a smartphone, a wearable computing device, or any other device capable of receiving and executing app code in order to configure the user device to perform new tasks (i.e., aside from tasks for operating the user device 120). The user device is equipped with one or more input/output (I/O) devices (not depicted in FIG. 1) which can display or otherwise project app-related content associated with apps tokenized as described herein and owned by the user of the user device 120. To this end, the user device 120 may have installed thereon a web browser (not shown) or other software for viewing or otherwise navigating to webpages.

As depicted in FIG. 1, the user device 120 includes a wallet 125. In this implementation, the wallet 125 may be a program stored and executed on the user device 120. In other implementations, the wallet 125 may be a device (not depicted in FIG. 1) connected to the user device 120. In yet other embodiments, the wallet 125 may be stored on another system (not depicted in FIG. 1) such as a server of an NFT platform or another server owned by a provider of NFT services. The wallet 125 stores ownership data used to access the media content of webpages represented in the database 145 such as, but not limited to, token ownership data, authentication credentials, and the like.

In accordance with various disclosed embodiments, the wallet 125 may further store data used for order processing. Such data used for order processing may include, but is not limited to, the aforementioned ownership data, keys used for accessing currencies (e.g., private keys used to access cryptocurrencies), data uniquely identifying an owner of the wallet 125, and the like. The wallet 125, by virtue of including data identifying the owner of the wallet 125, can therefore be used to authenticate a user requiring order processing via the wallet 125. In other words, the user's ability to access the wallet 125 can allow for authenticating the user since only the owner of the wallet 125 or a user authorized by the owner of the wallet 125 should have access to the wallet 125.

Figure 4:
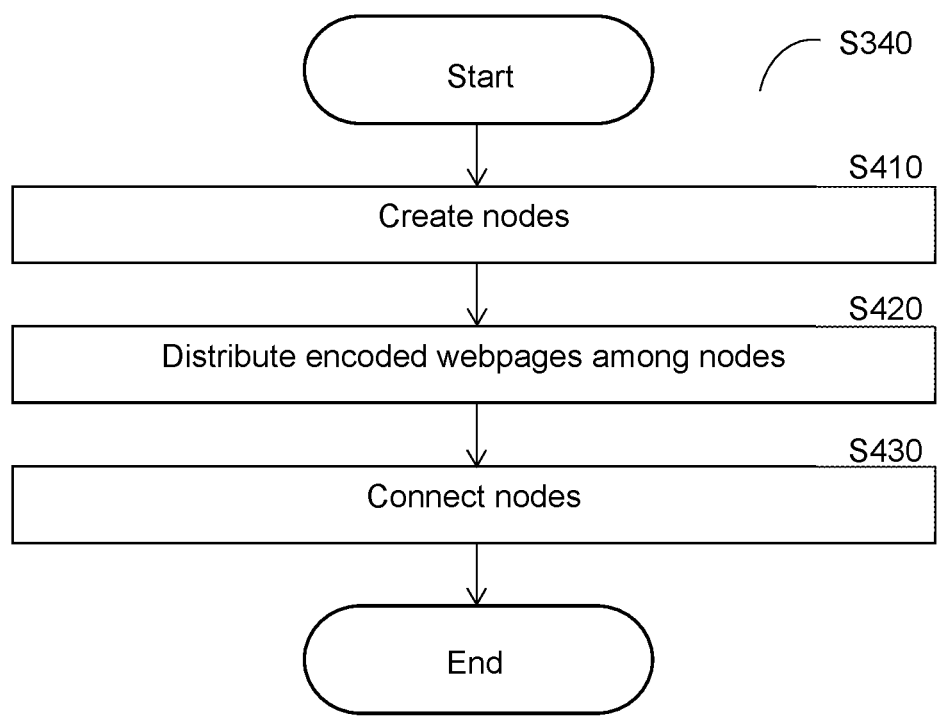
FIG. 4 is a flowchart illustrating a method for creating an NFT database according to an embodiment.
Figure 5:
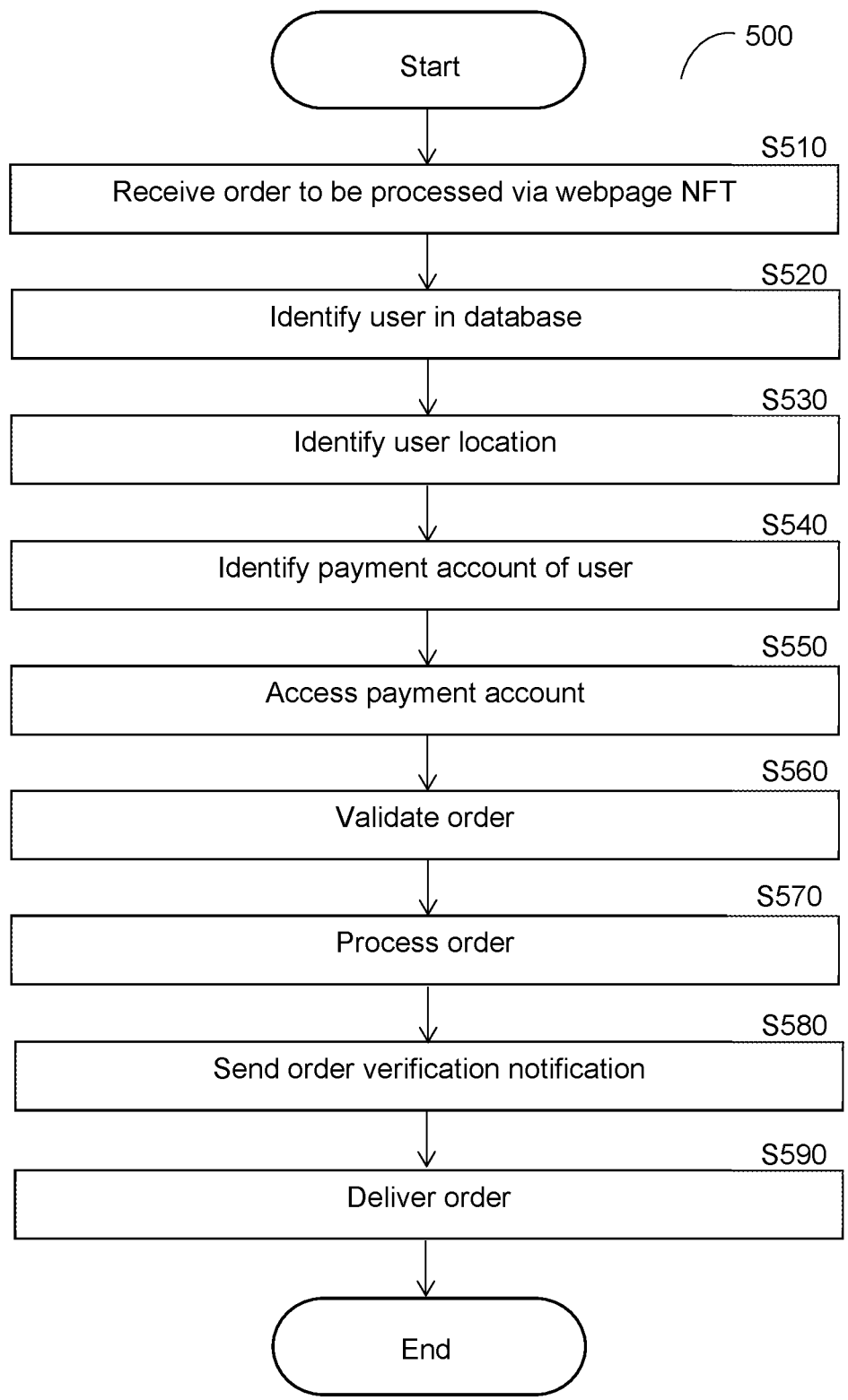
FIG. 5 is a flowchart illustrating a method for order processing using an NFT database according to an embodiment.

The order processor 130 is configured to at least process orders placed via webpage NFTs using an NFT database as described herein, for example, as discussed with respect to FIG. 5. To support this order processing, the order processor 130 may further be configured to encode webpages and create databases (e.g., a database 145) including nodes and webpage code also as described herein, for example, as discussed with respect to FIGS. 3 and 4. The order processor 130 may be further configured to provide app-related content associated with apps tokenized as webpage NFTs to owners of NFT nodes in the database 145 as described herein.

The data storage 140 stores a database 145 that is at least partially populated with code and nodes created by, for example, the order processor 130 as described herein. The database 145 stores nodes (not depicted in FIG. 1) connected to each other (e.g., via edges). The nodes at least include webpage nodes associated with respective webpages and NFT nodes associated with NFTs defined with respect to apps of the webpages. The webpages in the graphs include webpages containing code for performing tasks of corresponding apps. In an embodiment, the database 145 may be realized as a graph (e.g., a hypergraph such as a multi-tenant temporal hypergraph). An example illustration of nodes in the database 145 realized as a graph is described further below with respect to FIG. 2.

The app source 150 stores content of webpages including, but not limited to, apps having order processing functionality. Code of such apps is integrated into webpages that are encoded by the order processor 130 as described herein and stored in the database 145 in order to enable providing the appropriate application functionality when an owner of an NFT (e.g., a user of the user device 120) navigates to the respective webpages or otherwise requests to access the apps associated with the NFTs they own.

The blockchain network 160 includes multiple computing nodes (not shown), each computing node storing a copy of a blockchain 165. In various embodiments, the database 145 or a copy of the database 145 may be stored on the blockchain 165, thereby enabling the benefits of such blockchain use discussed above. To this end, in some embodiments, the order processor 130 may be configured to upload transactions to the blockchain 165 as the database 145 is updated. The transactions uploaded to the blockchain 165 may include a full copy of the database 145 or one or more changes to the existing copy of the database 145.

The payment processing system 170 is a server or other system of an entity that accepts payments for orders. The payment processing system 170 may store data or communicate with a database (not shown) storing data related to payment processing such as, but not limited to, payment accounts. Accordingly, payment accounts of users may be accessed, via the payment processing system 170, in order to process orders as described herein.

It should be noted that the network diagram 100 is merely an example, and that other combinations of networked components may be equally utilized without departing from the scope of the disclosure. Further, it should be noted that all components illustrated in FIG. 1 are depicted as communicating via a single network 110 merely for simplicity, but that different networks or no networks may be used for different communications among the components without departing from the scope of the disclosure.

Figure 2A:
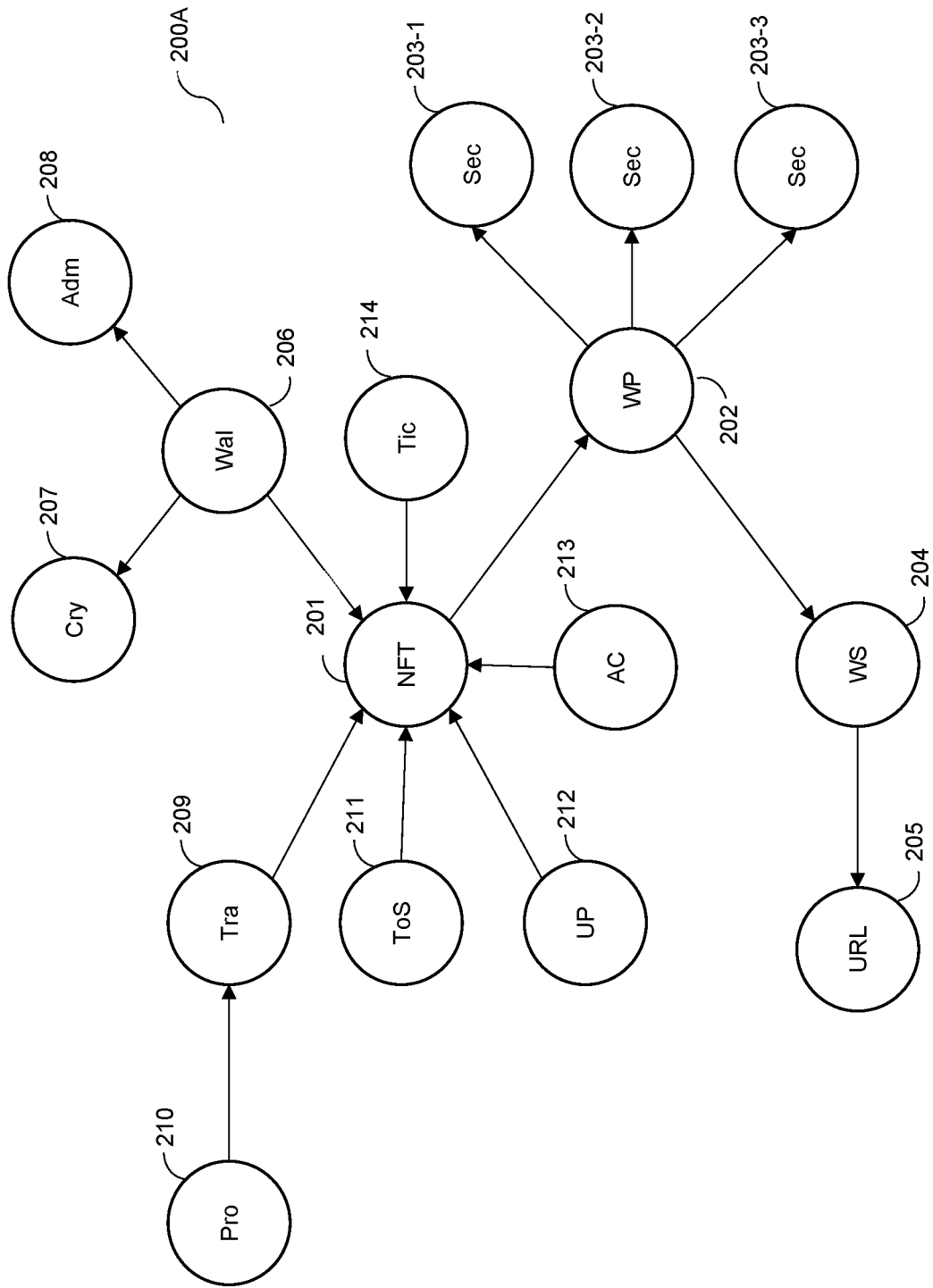
FIG. 2A is a visual depiction of nodes in a database realized as a hypergraph.

FIG. 2A is a non-limiting example visual depiction 200A of nodes in a database realized as a hypergraph.

The example visual depiction 200A includes various nodes connected to an NFT node 201. The NFT node 201 represents a tokenized version of a unique asset (not shown) and, specifically according to various disclosed embodiments, the unique asset is an app or portion thereof (e.g., certain features of an app that can be discretely defined with respect to distinct portions of code). Each app or portion thereof is associated with certain tasks and has code for performing these tasks such that, when the app or portion is executed on a device (e.g., the user device 120, FIG. 1), the device becomes configured to perform these associated tasks. Instructions for performing associated tasks of the app can be included in a webpage such that the webpage can be encoded into portions of code (e.g., code in hypertext markup language) for performing tasks associated with that app.

In some embodiments, the NFT node 201 may further include transaction data indicating historical transactions involving the NFT represented by the NFT node 201 (e.g., transactions which resulted in modification of the database involving changing connections between the NFT node 201 and wallet nodes or owner nodes), the initial creation of the NFT node 201, both, and the like. Consequently, the NFT node 201 may also include a complete history of ownership of the NFT. Storing such historical data allows the NFT node 201 to serve as a proof of authenticity or otherwise as a proof of ownership history for the NFT represented by the NFT node 201.

The NFT node 201 is connected to a webpage (WP) node 202 representing a corresponding webpage tokenized via the hypergraph. In an embodiment, the webpage node 202 represents a webpage that functions as one or more apps, for example, by having code for performing tasks of the apps. When a user views or otherwise navigates to the webpage represented by the webpage node 202, the user can access app functionality of the corresponding apps.

In various embodiments, the NFT node 201 includes one or more portions of code created by encoding the corresponding webpage represented by the webpage node 202 connected to the NFT node 201. Such portions of code may include instructions in formats such as, but not limited to, cascading style sheets (CSS), Javascript, hypertext markup language (HTML), combinations thereof, and the like. In other embodiments (not shown), such portions of code may be stored in code nodes (not shown) which are distinct from the NFT node 201 and are connected to the NFT node 201, the webpage node 202, or both. Such portions of code can be provided to an authorized device, thereby allowing such an authorized device to use the portions of code to generate a view of the webpage and perform any tasks of the corresponding apps of the webpage including, but not limited to, tasks related to order processing.

The portions of code for the webpage associated with the webpage node 202 may further include code for providing functionality that facilitates app usage. As non-limiting examples, such functionality may include accessing the database in order to identify nodes connected to the NFT node 201, to the webpage node 202, or both. Accessing the database and identifying such connected nodes may be utilized to facilitate providing information which may be needed for certain app features such as, but not limited to, authentication, payment processing, both, and the like. As a non-limiting example, the wallet node 206 may be associated with a particular user and therefore may be used to verify the user's identity, thereby serving as a factor of authentication. Further, any cryptocurrency (e.g., as represented by the cryptocurrency node 207) or other units of currency represented by nodes associated with the wallet node 206 may be used for payments in transactions made via the app. Providing such app-relevant functionality via accessing nodes in the database can reduce the number of interactions and time spent interacting with the user, thereby improving user experiences with respect to user interfaces displayed on a user device such as the user device 120.

In some embodiments, the webpage node 202 may further be connected to multiple section nodes such as section (Sec) nodes 203-1 through 203-3. The section nodes 203-1 through 203-3 represent different sections of the webpage represented by the connected webpage node 202. By representing sections of webpages as distinct nodes, webpage tokenization may be realized in a more granular fashion, i.e., such that multiple tokens may be created for a single webpage and multiple owning entities may each effectively own a different portion of the same webpage. The portion of a webpage for a respective owning entity may be represented and rendered as a distinct webpage including the corresponding content owned by that entity.

Further, in at least some embodiments, any or all of the nodes in the graph, and in particular any of the section nodes 203 or a ticket (Tic) node 214, may be associated with respective start times, end times, or both. These start and end times may be included in data of their respective nodes, may be implemented as rules included in other nodes (e.g., the usage policy node 212), or a combination thereof (e.g., the usage policy node 212 may include rules for activating and deactivating based on start and end times, and each node may store its own start and end time data).

When the section nodes 203 are associated with start and/or end times, the sections associated with webpages may be activated when their respective start times occur and may be terminated (i.e., expired) when their respective end times occur. To this end, in an embodiment, each of the section nodes 203 may be associated with one or more respective features of an app, and those features may be enabled or disabled based on the activation or termination of their respective sections. This can allow for, among other things, allowing apps to remain functional while allowing certain app features to expire based on the passage of time. This may be relevant when, for example, an app is created for a particular event and some app features are only relevant until the day after the event.

As a non-limiting example, an app represented by the NFT node 201 may function as a ticket to an event being hosted on Feb. 3, 2022, and may also have functionality related to the event including processing orders at the event venue. The section node 203-1 may represent app features used to grant a user access to the event (e.g., displaying a ticket on the user's device) and have an end date of Feb. 4, 2022, such that the ticket-displaying functionality of the app becomes disabled on Feb. 4, 2022. The section node 203-2 may represent app features used for order processing at the event, which may also have an end date of Feb. 4, 2022. The section node 203-3 may represent app features related to collectability such as, but not limited to, displaying images showing event highlights, playing video captured at the event, and the like. In this example, the section node 203-3, unlike the other section nodes 203-1 and 203-2, may not have an end data and its corresponding app features may therefore be accessed after the event has ended. In this regard, the app NFT may act as a souvenir of the event similar to a digital version of a ticket stub, which in turn can be resold as a collectible.

Additionally, in various implementations where nodes have start and end times, the start and end times for different section nodes 203 may be coordinated such that one section is activated as another expires. In the non-limiting example above where the section node 203-3 acts as a souvenir of the event, the section node 203-3 may have a start time of Feb. 4, 2022, such that the section node 203-3 is activated as the section nodes 203-1 and 203-2 expire. When the webpage associated with these sections is regenerated in the cache after Feb. 4, 2022, the portions of the webpage related to the section nodes 203-1 and 203-2 are replaced with portions of the webpage related to the section node 203-3.

The ticket (Tic) node 214 may represent a ticket to an event, where the ticket can be accessed via the app represented by the NFT node 201 connected to the ticket node 214. In some implementations, the ticket node 214 may store location data related to the ticket. As a non-limiting example, the ticket node 214 may represent a ticket to an event in a stadium, and the location data stored in the ticket may indicate a seat, box, or other location within the venue of the event. As another non-limiting example, the ticket node 214 may represent a ticket to a party on a boat, and the location data stored in the ticket may indicate an address or other geographic location at which the boat is docked at the beginning of the event. The location data stored in or otherwise related to the ticket node 214 may be accessed and utilized to provide location-based application functionality such as, but not limited to, projecting a display area showing the location (e.g. a map of a stadium or of a geographic area), for example as part of the webpage corresponding to the NFT associated with the ticket.

The ticket node may have associated start and end times corresponding to the start and end of the event, respectively, such that the ticket is active when the event has begun and expires once the event has ended. In some embodiments, the portions of code for the encoded webpage may include instructions for retrieving and displaying media content related to the event of the ticket when the ticket has expired, for example media content retrieved from a website having media content of the event. Alternatively or collectively, the portions of code may include instructions for causing display of media content that visually represents the ticket, for example, an image of a ticket with text showing information about the event.

In some implementations, the ticket node 214 may further store location data indicating a location which should be occupied by the user during the event. As a non-limiting example, the ticket node 214 may indicate a particular seat in a stadium. Such location data may be used, for example, to deliver the order (e.g., to deliver the order by drone to the seat where the user is), to distribute prizes or offer discounts (e.g., prizes or discounts which are assigned to users occupying particular seats), both, and the like.

Figure 2B:
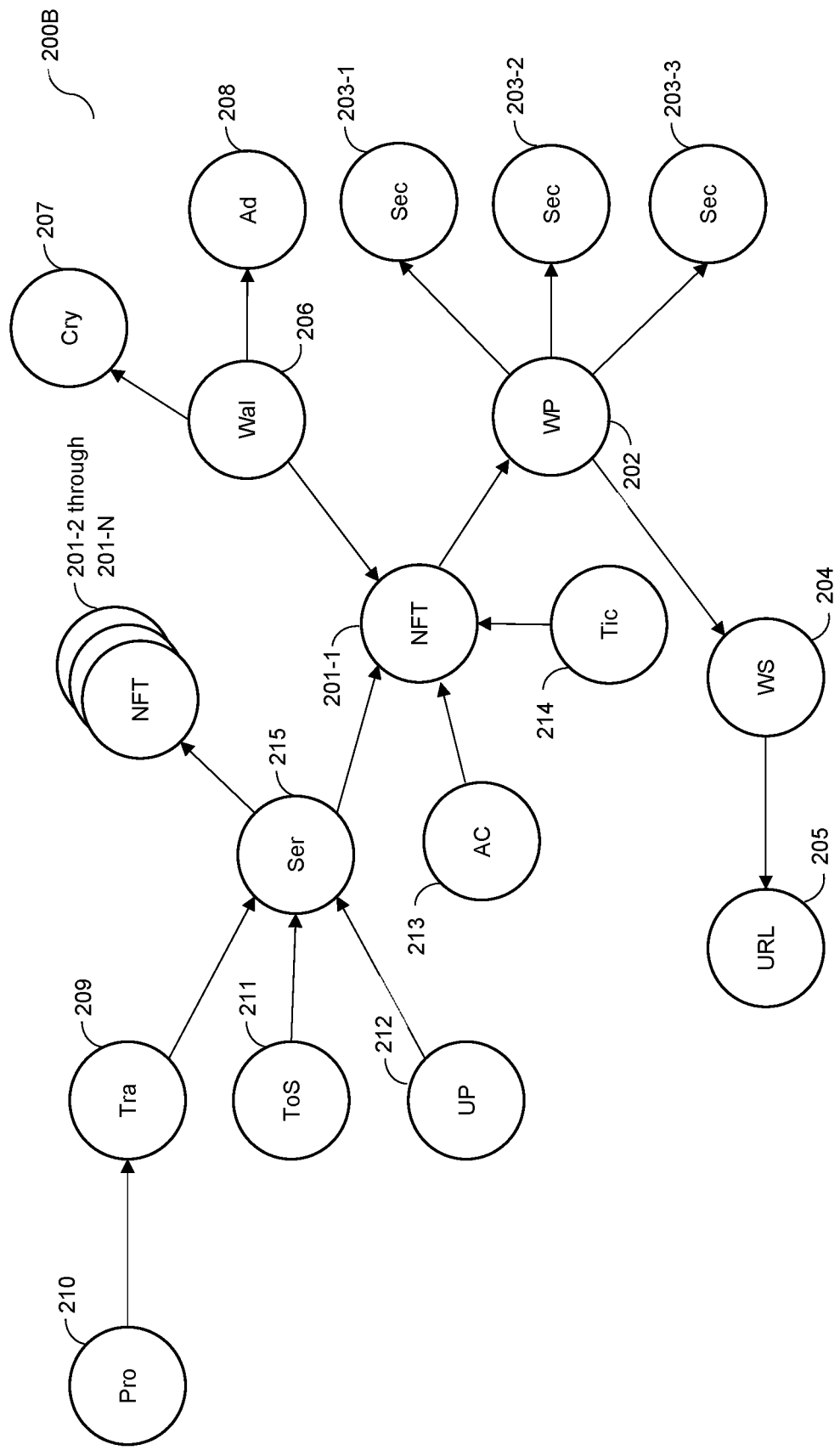
FIG. 2B is a visual depiction of nodes in a database including a token series node.

Although a single ticket node 214 is depicted in FIGS. 2A-B, multiple ticket nodes may be connected to a given NFT node 201 in accordance with the disclosed embodiments. By allowing for connecting multiple tickets to a given NFT node 201 (either simultaneously, at different times, or both), the app represented by the NFT node 201 may be utilized for multiple events, each of which may have its own ticket represented by a respective ticket node. This allows for reusing the app rather than requiring a new app (and therefore new corresponding NFT and webpage nodes) be made for each event.

The webpage node 202 may further be connected to a website (WS) node 204 representing the website including the webpage represented by the webpage node 202. The website node 204 may further be connected to other webpage nodes (not shown) representing various webpages of the website. Additionally, the website node 204 may be connected to a web location node such as a uniform resource locator (URL) node 205 representing a URL associated with the webpage. In other embodiments (not shown), each webpage node may also be connected to a corresponding URL node indicating the location of the respective webpage on the Internet.

The NFT node 201 may further be connected to a node associated with an entity that owns the NFT of the NFT node 201 such as the wallet (Wal) node 206 or an owner node (not shown). The wallet node 206 represents and stores data indicating ownership of the NFT represented by the NFT node 201 such that the connection between the wallet node 206 and the NFT node 201 can be utilized to confirm ownership of the NFT by the owner of the wallet. The wallet node 206 may also optionally represent a wallet (e.g., the wallet 125, FIG. 1).

The wallet node 206, in turn, may be connected to one or more cryptocurrency (Cry) nodes 207, a wallet administrator (Adm) node 208, or both. The cryptocurrency nodes 207 may represent cryptocurrency owned by the owner of the wallet. Such cryptocurrency may be used to conduct transactions involving transfers of NFTs such as using the cryptocurrency to purchase an NFT to be transferred to the wallet or receiving cryptocurrency as payment for such an NFT. The wallet administrator node 208 may be associated with an administrator of the wallet (e.g., the owner of the wallet or a third party entity who has been granted the right to act on behalf of the wallet owner), and may store data indicating policies related to use of the wallet.

Instead of or in addition to being connected to cryptocurrency nodes 207, the wallet node 206 or owner node may store payment credentials used to access one or more payment accounts of the user. Such data may include, but is not limited to, identifiers of the payment accounts, web locations at which the payment accounts can be accessed (e.g., a URL), credentials used to access the payment account (e.g., username, password, etc.), credit card information, bank routing number, combinations thereof, and the like. The credit card information may include, but is not limited to, a credit card number, expiration date, and card verification value (CVV) or card security code (CSC).

Alternatively or in addition, the wallet node 206 or owner node may be connected to other currency nodes (not shown) representing other types of currency owned by the user. Such currency may be, but is not limited to, legal tender or tokens. The tokens may be app-specific or event specific tokens which can be exchanged for items at a given event venue, business location, web address, other location, or otherwise for orders from certain entities. In some implementations, data of the currency nodes may be modified to indicate funds added or removed (e.g., as payment for orders). The funds may be added, for example, in response to receiving funds from the user (e.g., receiving funds at an account of a webpage NFT provider operating the system that minted the webpage NFT). Accordingly, storing data representing such funds in the database may allow for processing orders without needing to access external payment processing services.

The NFT node 201 may further be connected to one or more nodes representing policies to be applied in relation to creation, use, or access of NFT nodes such as, but not limited to, a transfer node 209, a terms of service (ToS) node 211, a usage policy (UP) node 212, or a combination thereof.

The transfer node 209 may act as a minting contract, i.e., a smart contract defining policies for creation of NFT nodes for webpages (i.e., minting of webpages as NFTs). To this end, the transfer node 209 may store code that, when executed, applies the rules of the policy to the creation of NFT nodes such as the NFT node 201. Such policies may include, but are not limited to, restrictions on the number of NFTs which can be created (i.e., the number of NFT nodes which can be created) for a given webpage or portion thereof. As a non-limiting example, such a policy may limit the creation of NFTs for a given webpage to 100 NFTs total.

In some implementations, the transfer node 209 may further be connected to a provider (Pro) node 210 representing a provider of the NFT. Such a provider may be, but is not limited to, a creator of the NFT (e.g., an app developer). In this regard, the provider node 210 may serve as evidence of the originator of the NFT node 201.

The terms of service node 211 includes code that, when executed, applies the rules of one or more policies defining terms of service for an NFT. Such policies may require, for example, that a user to whom the NFT is transferred (e.g., a user of a wallet represented by a wallet node to which the NFT node will be connected) agree to terms of service before being granted ownership of or access to the NFT.

The usage policy node 212 includes code that, when executed, applies the rules of one or more policies defining restrictions on use of an NFT, access to the NFT, both, and the like. Such restrictions may include, but are not limited to, requiring that NFTs not be shared for free, limiting the number of uses of a given NFT, and the like. In various embodiments, multiple usage policies (which may be represented by multiple usage policy nodes, not shown), may be applied to any given NFT or series of NFTs. The usage policies may be defined by a platform for the NFTs, a marketplace for the NFTs, a provider of an NFT, or a combination thereof, depending on the implementation.

In a further embodiment, the usage policy represented by the usage policy node 212 may require an access code before using or accessing the NFT of the connected NFT node 201 in order to prevent unauthorized access. To this end, the NFT node 201 may also be connected to an access code (AC) node 213 representing an access code required to use or access the NFT. As a non-limiting example, before web content of the webpage represented by the webpage node 202 is provided, a user of the wallet represented by the wallet node 206 or other user indicated by the wallet node 206 may be required to enter the access code indicated by the access code node 213.

FIG. 2B is a non-limiting example visual depiction 200B of nodes in a database including a token series node. As depicted in FIG. 2B, the nodes of the database further include an NFT series (Ser) node 215. The NFT series node 215 may define a series of related apps such as, but not limited to, apps acting as respective tickets to the same event, apps of the same type (e.g., effectively different copies of the same app), and the like.

The NFT series node 215 is connected to multiple NFT nodes including the NFT node 201-1 and other NFT nodes 201-2 through 201-N. As depicted in FIG. 2B, the series node 215 may be connected to any of the transfer node 209, the terms of service node 211, and the usage policy node 212, such that rules and policies defined in data of those nodes may be applied to all of the NFTs represented by the NFT nodes 201-1 through 201-N. Accordingly, using series nodes such as the NFT series node 215 allows for defining policies for groupings of NFTs rather than defining policies individually per NFT. As new NFTs are added to a series (for example, by connecting new NFT nodes to the NFT series node 215), the policies for the NFT series node 215 may be automatically linked to their respective NFT nodes via the connections in the database.

Further, in another implementation (not depicted in FIG. 2B), additional policy-related nodes (e.g., additional transfer nodes, terms of service nodes, and/or usage policy nodes) may be connected to any or all of the NFT nodes 201-1 through 201-N such that, in addition to any policies applicable to all NFTs in the series, each NFT may have its own policies applied.

It should be noted that FIGS. 2A and 2B depict various specific numbers of nodes, numbers of connections, types of nodes, and connections between different types of nodes for example purposes, but that the disclosed embodiments are not necessarily limited to the specific depiction of nodes and connections illustrated in FIGS. 2A and 2B. In particular, only one instance of many types of nodes are depicted in FIGS. 2A and 2B for simplicity purposes, but in various implementations multiple of each node may be included without departing from the scope of the disclosure. Further, the additional NFT nodes 201-2 through 201-N are depicted without connections to nodes other than the series node 215 merely for simplicity, and that, in various implementations, each of these NFTs 201-2 through 201-N may be connected to other nodes.

Figure 3:
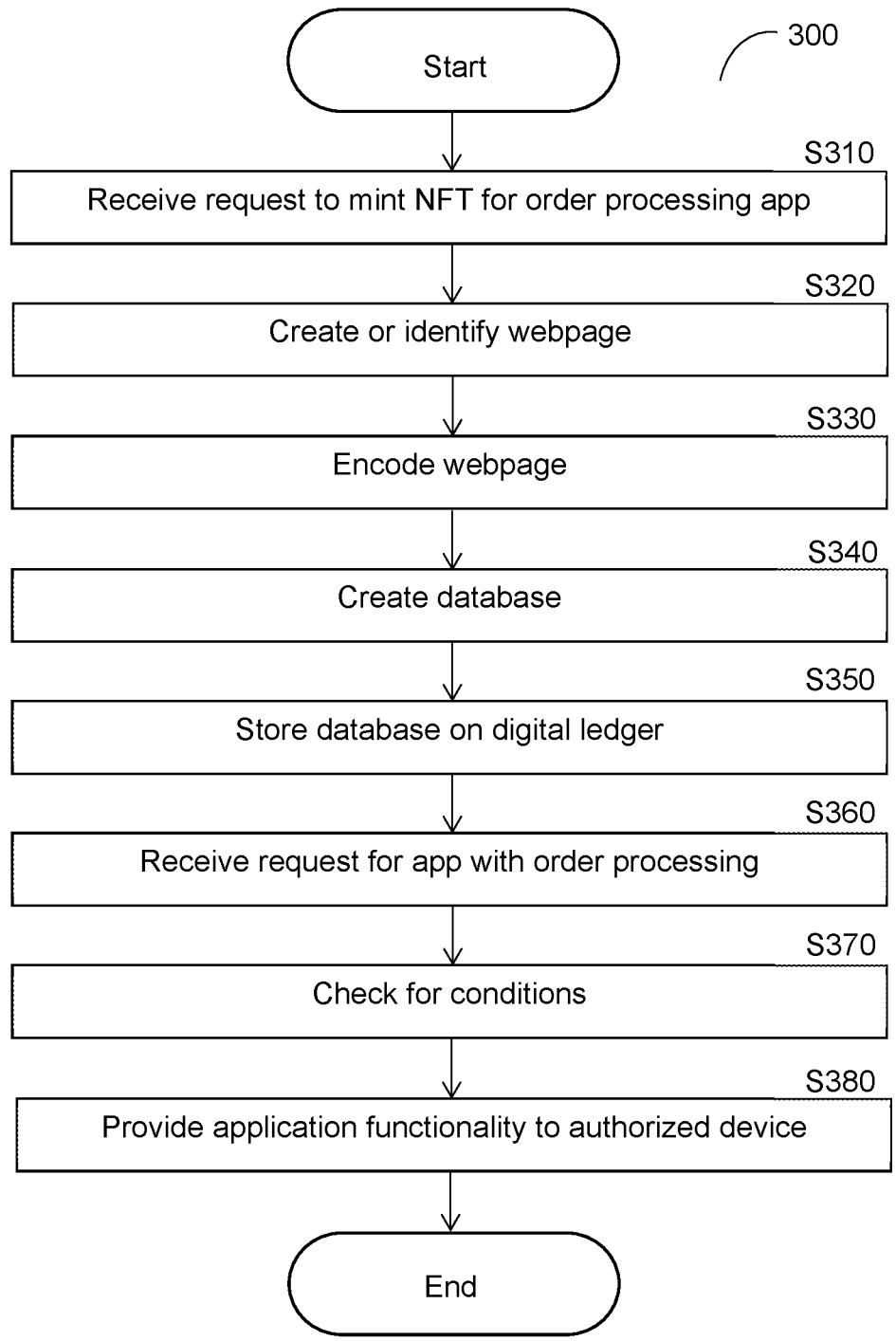
FIG. 3 is a flowchart illustrating a method for performing order processing via webpage NFTs according to an embodiment.

FIG. 3 is a flowchart illustrating a method for tokenizing apps as non-fungible tokens (NFTs) and providing app functionality via NFT nodes according to an embodiment. In an embodiment, part or all of the method is performed by the order processor 130.

At S310, a request to mint an NFT for a software application (app) or portion thereof is received. The request may include, but is not limited to, information needed to access the app (e.g., a location of the app, authentication credentials, etc.), contents of the app (e.g., software instructions for performing tasks associated with the app), combinations thereof, and the like. The request may further include various restrictions to be applied to the NFTs representing the webpage. Such restrictions may include, but are not limited to, terms of service, usage policies, access codes, combinations thereof, and the like. The minting process at least includes encoding all or a portion of the webpage as well as adding tokens for the webpage to a database as described further below.

The webpage is associated with one or more apps, portions of apps, or a combination thereof, and includes at least instructions for performing tasks associated with the respective apps and portions. In accordance with various disclosed embodiments, the tasks associated with the apps include tasks for performing order processing and related functions (e.g., functions related to payment processing). As a non-limiting example where an app is a game app for playing poker, the webpage includes instructions for displaying cards and a digital poker table as well as instructions for randomizing a deck, for making decisions by computer players, for tracking chips, and the like. As a non-limiting example where an app functions as a ticket for an event, the webpage at least includes instructions for displaying an access pass (e.g., an image of a ticket) to the event on a user device, and may further include instructions for other event-related tasks such as displaying a digital gift shop for the event, providing a payment portal for goods sold at the event, projecting media content associated with the event, projecting a display area depicting a location of the event (e.g., a map of a stadium showing a particular seat or a map of a geographic area showing a particular address), combinations thereof, and the like.

At S320, a webpage for the app is created or identified. The webpage may be an existing webpage including software instructions for performing certain tasks that is identified based on a locator received with the request at S310, or may be created based on instructions provided by an app developer or other provider of the app which the webpage will be based on. By creating a webpage including instructions for performing tasks of the app, an existing app can effectively be converted into a webpage and tokenized as described herein.

At S330, the webpage is encoded into one or more portions of code. The portions of code include instructions that, when executed by a system (for example, the user device 120, FIG. 1), causes the system to perform tasks of the respective apps or portions thereof. Accordingly, such code can be stored in a database (specifically, in nodes of the database) such that the appropriate code can be provided (e.g., to a user device) when the owner of the NFT representing the respective portion(s) of code requests to access the application functionality of the app, and execution of the code on a device of that owner allows for performing the tasks associated with the app.

At S340, a database is created based on the encoded webpage. Creating the database may include creating a new database or adding to an existing database.

The created database includes nodes, and the portions of code of the encoded webpage are distributed among at least some of the nodes of the database. In an embodiment, the database at least includes webpage nodes and NFT nodes. Each webpage node is associated with a respective webpage and indicates at least a portion of the respective webpage that is represented by the node. Each NFT node represents an NFT indicating ownership of a webpage or portion thereof. Each NFT node is at least connected to one or more webpage nodes. In a further embodiment, the portions of code are distributed among the webpage nodes.

The NFT nodes represent tokens which indicate ownership of one or more non-interchangeable assets with respect to a webpage. In accordance with various disclosed embodiments, each non-interchangeable asset is an app or a portion of an app, where the app or portion of the app includes instructions for performing one or more tasks by a computing device. The NFT nodes may therefore represent ownership of the underlying apps or portions thereof.

The NFTs include tokens representing non-interchangeable items such as different apps or distinct copies of the same app. An NFT is a non-interchangeable token representing a digital item (i.e., a data item). These tokens are non-interchangeable at least in that any given NFT is not necessarily equivalent to any other NFT, in other words, at least some NFTs represent different underlying digital assets as compared to at least some other NFTs. It should be noted that some NFTs may be equivalent to each other without departing from the scope of the disclosed embodiments. As a non-limiting example, some NFTs may be NFTs representing different copies of the same media player app and may effectively provide the same application functionality as each other.

The nodes of the database may further include other types of nodes such as, but not limited to, wallet nodes, website nodes, location identifier nodes (e.g., uniform resource locator or URL nodes), section nodes, transfer nodes, terms of service nodes, usage policy nodes, content nodes, ticket nodes, combinations thereof, and the like. Various types of nodes are depicted in and described with respect to FIGS. 2A-B as discussed above.

In an embodiment, the database may be created as discussed with respect to FIG. 4. FIG. 4 is a flowchart S340 illustrating a method for creating an NFT database according to an embodiment.

At S410, nodes of the database are created. In an embodiment, the nodes in the database at least include webpage nodes representing encoded webpages or portions thereof as well as NFT nodes representing NFTs indicating ownership of respective webpages or portions thereof. In a further embodiment, the nodes of the database include nodes associated with entities who own the NFTs such as wallet nodes representing wallets owned by such entities or owner nodes representing the entities themselves. In yet a further embodiment, the nodes of the database may further include any of the other nodes described above with respect to FIGS. 2A and 2B. It should be noted that the database may include other nodes without departing from the scope of the disclosure.

At S420, the portions of code of encoded webpages are distributed among the created nodes. In an embodiment, the portions of code may be distributed into webpage nodes of the respective webpages which were encoded into those portions of code. As a non-limiting example, a first webpage may be encoded into a first portion of code and a second webpage may be encoded into a second portion of code such that the first portion of code is distributed to a first webpage node representing the first webpage and the second portion of code is distributed to a second webpage node representing the second webpage.

At S430, the created nodes are connected. In an embodiment, the created nodes are connected at least such that each NFT node is connected to a respective webpage node representing the apps or portions thereof to be provided as an NFT. In accordance with various disclosed embodiments, the created nodes are further connected such that each NFT node is also connected to a wallet node (e.g., the wallet node 206) or owner node associated with the entity who owns the NFT. In another embodiment, the created nodes may be connected such that each NFT node is further connected to nodes for enforcing restrictions on use or access of the respective NFT such as, but not limited to, transaction nodes, terms of service nodes, usage policy nodes 212, access code nodes 213, combinations thereof, and the like.

Returning to FIG. 3, at optional S350, the database is stored on a digital ledger. In an embodiment, S350 may include uploading the database to a decentralized digital ledger such as a blockchain. As noted above, storing the database on a blockchain allows for ensuring the accuracy of the data in the database by providing an immutable record against which the database can be compared when making transfers, and storing the database on a de1centralized ledger in addition to a centralized ledger allows for portability, i.e., the database may be transferred to a new digital ledger relatively easily. As a non-limiting example, the database may be stored as a side chain on a blockchain.

At S360, a request for an app with order processing features is received. The request may indicate, for example, the app associated with the webpage (e.g., an NFT represented by an NFT node connected to a webpage node of the webpage in the database). The request may further include other information for accessing the webpage content such as, but not limited to, authentication credentials, authorized devices or accounts (i.e., devices or accounts that are authorized to access the app, payment accounts used by the app, etc.), both, and the like.

In various embodiments, the request is received by a user navigating, via their user device, to a location (e.g., a uniform resource locator) of a webpage corresponding to the app NFT they own. When the user navigates to such a location (e.g., via a browser software application installed on the user device), the user device requests the web content of the webpage from a host server, thereby requesting the app functionality. When the host server provides such web content to the user device and the code included therein is executed on the user device, the user device becomes configured to perform one or more tasks of the corresponding app.

At optional S370, any conditions for delivering the requested app (i.e., the app or portion thereof for which application functionality has been requested) are identified. Such conditions may be defined in data of nodes associated with the NFT node such as, but not limited to, usage policy nodes or terms of service nodes. To this end, in an embodiment, S380 may include scanning the database for nodes connected (either directly or indirectly, i.e., through other nodes) to the NFT node and identifying conditions defined in those nodes. The conditions are applied when providing the requested content and may be used to limit how the content is used or to deny access to the content entirely. The conditions may be set by different entities, for example, some conditions may be set by an operator of an NFT platform (e.g., an NFT platform), other conditions may be set by an originator of an NFT (e.g., an artist who created a work represented by an NFT or PDT), and yet other conditions may be set by an entity that provides the web-based content for tokenization (e.g., a record company, publisher, webpage owner, etc.).

At S380, the requested application functionality is provided to an authorized device, i.e., a device authorized to access the app by the owner of the respective NFTs associated with the webpage via the nodes of the database or a device used by a user of an authorized account indicated in the request. This effectively results in delivering the app to the user's device, at least temporarily. In an embodiment, S380 includes providing the respective portions of code through which the webpage is encoded to the authorized device. Because the portions of code of a webpage include instructions for performing tasks that provide certain app features and functionality, the authorized device can execute the portions of code, thereby causing the authorized device to perform such tasks and provide the user with features of the respective apps or portions thereof.

In some implementations, content of the webpage and, in particular, the code for providing the application functionality, may be stored on the user device for subsequent use once provided. As a non-limiting example, the code may be stored in a cache. Storing the code in a cache or other local storage of the user device allows for accessing the app even when the user device is not connected to the Internet. In other implementations, an Internet connection may be required to access a given app.

In an embodiment, the conditions identified at S370 are applied. It should be noted that, in some implementations, when a condition defining whether an app can be shared is not met, web content including the instructions for performing tasks of the app may not be provided at S370. As a non-limiting example, when a usage policy node associated with an NFT node representing an NFT includes data defining a condition requiring a user to accept a terms of use statement before using the app, the app functionality may only be provided once the user has clicked an "Accept" button. Optionally, a notification indicating the failure to meet one or more conditions may be sent to the authorized device or to a user device associated with the user who owns the NFT.

FIG. 5 is an example flowchart 500 illustrating a method for order processing using an NFT database according to an embodiment. In an embodiment, the method may be performed by the order processor 130, FIG. 1.

At S510, a request for an order to be processed is received via a webpage NFT. In an embodiment, the webpage NFT is a webpage encoded into portions of code and represented in a database as a webpage and NFT node pair, i.e., a combination of a webpage node and corresponding NFT node connected to each other as described above with respect to FIGS. 3 and 4. The webpage NFT is executed on a user device, and the request is initiated in response to user interactions with the webpage indicating that the user wishes to place an order through the webpage. As a non-limiting example, the user may browse items shown in the webpage, select one or more of those items to be added to a digital cart, and click a "Place Order" button.

At S520, a user who requested the order is identified based on data related to the webpage NFT in a database. In an embodiment, the user may be identified via a wallet node or owner node connected to the wallet and NFT node pair, for example, connected to the NFT node representing the app through which the order request was placed or the webpage node representing the webpage through which the order was placed. In this regard, it is noted that the user's identity may be initially established when the user is assigned a wallet or otherwise when a node associated with the user is created in the database. Thus, identifying that node connected to the webpage node representing the webpage through which the order request was placed within the database allows for accurately identifying the user who requested the order.

At optional S530, a location of the user may be identified. In an embodiment, the location is determined based on location data in the database, for example, location data stored in one of the nodes in the database. The location data may be used, for example, in order to deliver the ordered items as discussed further below.

The node from which the location data should be retrieved may depend on the implementation. As a non-limiting example where the user location is defined with respect to a particular seat in a stadium for an event, the location of the user may be determined based on location data stored in a ticket node for the event or in the NFT node representing the webpage NFT of the app through which the order was placed. As another non-limiting example where the user location is defined with respect to a home address of the user, the location of the user may be determined based on location data stored in a wallet node or owner node associated with the user.

At S540, a payment account of the user is identified. In an embodiment, the payment account may be determined based on data in a wallet or owner node in the database, or based on data in one or more other nodes in the database connected to the wallet or owner node. The payment account may be the wallet represented by the wallet node, or by an external payment account indicated in the data. To this end, in some embodiments, S540 may further include retrieving payment credentials needed to access the external payment account.

At S550, the identified payment account is accessed in order to cause processing of a payment for the order.

In an embodiment, S550 includes accessing the external payment account using the payment credentials. To this end, in such an embodiment, S550 may include sending a request for payment processing to a payment processing system (e.g., the payment processing system 170). The request may include some or all of the payment account data of the payment account identified at S540.

In another embodiment, S550 may include accessing currency stored in a wallet of the user (e.g., cryptocurrency indicated in cryptocurrency nodes associated with a wallet node represented by a wallet of the user). To this end, S550 may further include modifying the data in the database in order to change the amount of currency owned by the user as represented in the database (i.e., an amount of currency equal to the cost of the order).

At S560, the order is validated based on the identified user, user location, accessed payment account, or a combination thereof. In an embodiment, S560 may include confirming that the payment was successfully processed at S550. Alternatively or in addition, S560 may include verifying a user's eligibility to place the order based on the user's identity or location. As a non-limiting example, user eligibility to place orders may be restricted by address (e.g., when orders are limited to certain geographic areas). As another non-limiting example, only users at certain locations within a venue (e.g., at certain seats in a venue) may be eligible to place orders for certain items. As yet another non-limiting example, certain users may be indicated on a blacklist for the webpage and may therefore be ineligible to place orders through the webpage.

In a further embodiment, the order may be time-restricted such that the order can only be placed during a certain time period (e.g., on the day of an event), and validating the order may include confirming that the current time is within the period of time during which the order can be placed. Such a period of time may be indicated, for example, as start and end times in one of the nodes in the database (e.g., start and end times of a ticket node stored in the database).

In another embodiment, the order may be age-restricted such that the order can only be placed by users that are at least a certain age. As a non-limiting example, when the items being ordered include alcohol, the requirements for validating the order may further include confirming that the user's age meets local alcohol laws and regulations. The age of the user may be confirmed based on, for example, an age of the user indicated in their wallet or in a wallet node associated with the user.

At S570, the order is processed. Processing the order may include, but is not limited to, storing data representing the order, reducing inventory of each of the ordered items, both, and the like.

At optional S580, an order verification notification may be sent. The notification may be sent, for example, to the device through which the order was placed (e.g., via text or short message service message). Alternatively or additionally, the notification may be sent to a messaging account of the user (e.g., to a known email address of the user indicated in the database).

At optional S590, the order is delivered to the user. In some embodiments, the order may be delivered based on the location data identified at S530.

When the order is a physical item, S590 may include sending a notification to a packing and shipping entity in order to prompt packaging and shipping of the order, or sending a notification to a terminal operated by a merchant selling the ordered item. As a non-limiting example, when the user wishes to order a pretzel at a concession stand at an event, the user may request the order as described above and a notification confirming that the user ordered the pretzel may be sent to a terminal of a concession stand operator such that the concession stand operator gives the pretzel to the user, thereby delivering the pretzel. As another non-limiting example, when the user wishes to order the pretzel from their seat at the event, the user may request the order as described above and a notification confirming that the user ordered the pretzel may be sent to a terminal of a concession vendor who will bring the pretzel to the user's seat. To this end, the notification may further indicate the user's seat.

When the order is a digital item, S590 may include delivering the digital item to a digital account of the user. To this end, S590 may include sending the digital item or a link to the digital item to a messaging account of the user (e.g., an email address) or to the device through which the order was placed. Alternatively or additionally, S590 may include updating or sending a request to update a digital account associated with the user.

Figure 6:
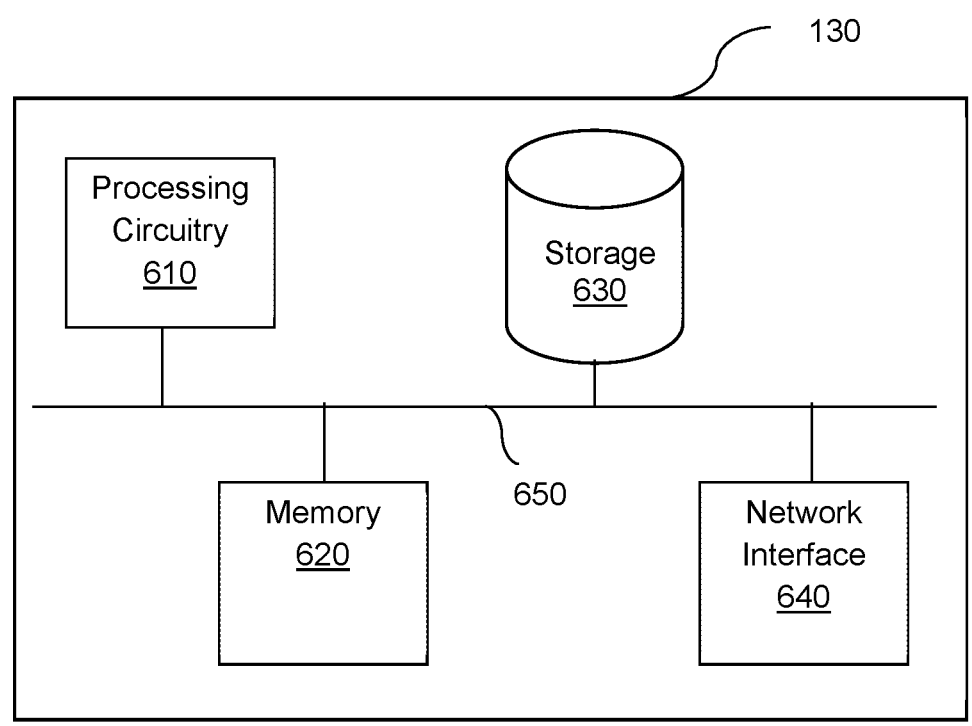
FIG. 6 is a schematic diagram of an order processor according to an embodiment.

FIG. 6 is an example schematic diagram of an order processor 130 according to an embodiment. The app provider 130 includes a processing circuitry 610 coupled to a memory 620, a storage 630, and a network interface 640. In an embodiment, the components of the order processor 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the app provider 130 to communicate with, for example, the user device 120, the data storage 140, the app source 150, the blockchain network 160, the payment processing system 170, combinations thereof, and the like.

It should be understood that the embodiments described herein are not limited to the specific architecture illustrated in FIG. 6, and other architectures may be equally used without departing from the scope of the disclosed embodiments.

It should be noted that the above discussion refers to apps or portions of apps, and that these references do not necessarily limit any of the disclosed embodiments. Specifically, a software application, or app as referred to herein, is a computer program designed to perform one or more computing tasks. To this end, each app has corresponding code for performing its respective tasks. A first app could be a portion of a second app, namely, if the first app has a subset of the code of the second app such that it configures a device to perform some, but not all, tasks that the second app configures the device perform. Any reference to an app herein does not necessarily refer to the entire original app, and may include only a portion of the original app without departing from the disclosed embodiments. As a non-limiting example, a music app may have code for performing tasks related to purchasing music as well as tasks related to playing media content (e.g., music audio), and each of these sets of code may be referred to as an app or as a portion of an app since each set of code is designed to perform one or more tasks that are a part of an original app. Designating apps as portions of other apps may be useful, for example, when different app features of an original app are to be implemented with different restrictions such as, but not limited to, different start and end times as discussed above with respect to section nodes.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for processing orders via webpage non-fungible tokens (NFTs), comprising:
   identifying a user and a payment account of the user with respect to a request for processing of an order received via a webpage NFT, wherein identifying the user and the payment account further comprises accessing a database including a plurality of nodes, wherein the webpage NFT is a webpage encoded into at least one portion of code and represented as at least one webpage and NFT node pair in the database, wherein the user and the payment account are identified based on data stored in at least one node of the plurality of nodes in the database connected to the webpage and NFT node pair, wherein the request for processing of the order is sent by the webpage NFT in response to user interactions with the webpage via a user device that navigated to the webpage;
   accessing the identified payment account in order to cause processing of a payment for the order; and
   processing the order when the payment has been processed.

2. The method of claim 1, wherein the at least one portion of code at least configures the user device to perform at least one computing task of a software application when the at least one portion of code executed on the device.

3. The method of claim 1, wherein the database further includes a wallet node associated with an owner of the webpage NFT and connected to the webpage and NFT node pair, wherein the payment account is identified based on data stored in the wallet node.

4. The method of claim 1, wherein accessing the identified payment account further comprises:
   modifying data in at least a portion of the at least one node of the plurality of nodes in the database connected to the webpage and NFT node pair, wherein the modified data reflects a removal of funds required for the order.

5. The method of claim 1, further comprising:
   identifying a location of the user based on the plurality of nodes in the database; and
   causing delivery of at least one item indicated in the request for processing the order based on the identified location of the user.

6. The method of claim 5, further comprising:
   validating the order by verifying eligibility of the user to place the order based on the identified location of the user.

7. The method of claim 6, wherein the plurality of nodes in the database includes a ticket node connected to the webpage and NFT node pair, wherein the ticket node indicates a period of time of an event, wherein validating the order further comprises:

accessing data of the ticket node connected to the webpage and NFT node pair in order to determine whether a current time is within the period of time of the event.

8. The method of claim 1, wherein the webpage is associated with at least one software application, wherein the at least one software application is associated with at least one computing task, wherein the at least one portion of code at least configures the device to perform the at least one computing task when the at least one portion of code executed on the device, wherein the encoded at least one portion of code of the webpage NFT is stored among nodes in the database.

9. The method of claim 8, further comprising:
encoding the webpage into the at least one portion of code;
creating the database at least by storing the webpage and NFT node pair among the nodes in the database and storing the encoded at least one portion of code among the nodes in the database; and
providing the at least one portion of code to a device authorized by an owner of the webpage NFT.

10. A non-transitory computer readable medium having stored thereon instructions for causing a processing circuitry to execute a process, the process comprising:
identifying a user and a payment account of the user with respect to a request for processing of an order received via a webpage NFT, wherein identifying the user and the payment account further comprises accessing a database including a plurality of nodes, wherein the webpage NFT is a webpage encoded into at least one portion of code and represented as at least one webpage and NFT node pair in the database, wherein the user and the payment account are identified based on data stored in at least one node of the plurality of nodes in the database connected to the webpage and NFT node pair, wherein the request for processing of the order is sent by the webpage NFT in response to user interactions with the webpage via a user device that navigated to the webpage;
accessing the identified payment account in order to cause processing of a payment for the order; and
processing the order when the payment has been processed.

11. A system for processing orders via webpage non-fungible tokens (NFTs), comprising:
a processing circuitry; and
a memory, the memory containing instructions that, when executed by the processing circuitry, configure the system to:
identifying a user and a payment account of the user with respect to a request for processing of an order received via a webpage NFT, wherein the system is further configured to access a database including a plurality of nodes, wherein the webpage NFT is a webpage encoded into at least one portion of code and represented as at least one webpage and NFT node pair in the database, wherein the user and the payment account are identified based on data stored in at least one node of the plurality of nodes in the database connected to the webpage and NFT node pair, wherein the request for processing of the order is sent by the webpage NFT in response to user interactions with the webpage via a user device that navigated to the webpage;
access the identified payment account in order to cause processing of a payment for the order; and
process the order when the payment has been processed.

12. The system of claim 11, wherein the at least one portion of code at least configures the user device to perform at least one computing task of a software application when the at least one portion of code executed on the device.

13. The system of claim 11, wherein the database further includes a wallet node associated with an owner of the webpage NFT and connected to the webpage and NFT node pair, wherein the payment account is identified based on data stored in the wallet node.

14. The system of claim 11, wherein the system is further configured to:
modify data in at least a portion of the at least one node of the plurality of nodes in the database connected to the webpage and NFT node pair, wherein the modified data reflects a removal of funds required for the order.

15. The system of claim 11, wherein the system is further configured to:
identify a location of the user based on the plurality of nodes in the database; and
cause delivery of at least one item indicated in the request for processing the order based on the identified location of the user.

16. The system of claim 15, wherein the system is further configured to:
validate the order by verifying eligibility of the user to place the order based on the identified location of the user.

17. The system of claim 16, wherein the plurality of nodes in the database includes a ticket node connected to the webpage and NFT node pair, wherein the ticket node indicates a period of time of an event, wherein the system is further configured to:
access data of the ticket node connected to the webpage and NFT node pair in order to determine whether a current time is within the period of time of the event.

18. The system of claim 11, wherein the webpage is associated with at least one software application, wherein the at least one software application is associated with at least one computing task, wherein the at least one portion of code at least configures the device to perform the at least one computing task when the at least one portion of code executed on the device, wherein the encoded at least one portion of code of the webpage NFT is stored among nodes in the database.

19. The system of claim 18, wherein the system is further configured to:
encode the webpage into the at least one portion of code;
create the database at least by storing the webpage and NFT node pair among the nodes in the database and storing the encoded at least one portion of code among the nodes in the database; and
provide the at least one portion of code to a device authorized by an owner of the webpage NFT.

* * * * *